United States Patent [19]
Okamoto et al.

[11] 4,372,647
[45] Feb. 8, 1983

[54] SINGLE MODE OPTICAL FIBERS

[75] Inventors: Katsunari Okamoto; Takao Edahiro, both of Mito; Akio Kawana, Komae; Tetsuo Miya, Mito, all of Japan

[73] Assignee: Nippon Telegraph & Telephone Public Corporation, Tokyo, Japan

[21] Appl. No.: 192,704

[22] Filed: Oct. 1, 1980

[30] Foreign Application Priority Data

Oct. 8, 1979 [JP] Japan .............................. 54-130452
Jul. 14, 1980 [JP] Japan .............................. 55-95956

[51] Int. Cl.³ .............................................. G02B 5/14
[52] U.S. Cl. ............................... 350/96.33; 350/96.34
[58] Field of Search .................. 350/96.1, 96.3, 96.31, 350/96.32, 96.33, 96.34; 250/227

[56] References Cited

U.S. PATENT DOCUMENTS 3,997,241 12/1976 Nishida et al. ................... 350/96.33
4,185,890 1/1980 Onoda et al. ..................... 350/96.33
4,206,968 6/1980 Suganuma et al. ............... 350/96.34

OTHER PUBLICATIONS

Kawakimi et al., "Characteristics of a Doubly Clad Optical Fiber with a Low-Index Inner Cladding", IEEE Journal of Quantum Electronics, Dec. 1974; pp. 879-887.
Daikoku et al., "Direct Measurement of Wavelength Dispersion in Optical Fibres-Difference Method", Electronics Letters, Mar. 2, 1978, vol. 14, No. 5; pp. 149-151.
Miya et al., "Ultimate Low Loss Single-Mode Fibre at 1.55 μm", Electronics Letters, Feb. 15, 1979; pp. 106-108.

*Primary Examiner*—Marvin L. Nussbaum
*Attorney, Agent, or Firm*—Blakely, Sokoloff, Taylor & Zafman

[57] ABSTRACT

In a single mode optical fiber of the type comprising a core, a cladding surrounding the core and an intermediate layer, the refractive indices n1, n2 and n3 respectively of the core, the cladding and the intermediate layer are selected such that the following relations are satisfied

$$0.5 < \Delta 1 < 1.5$$

$$-0.3 > \Delta 2 > -1.0$$

where $$\Delta 1 = \frac{n1 - n2}{n1} \times 100\% \text{ and } \Delta 2 = \frac{n3 - n2}{n2} \times 100\%$$

7 Claims, 12 Drawing Figures

SINGLE MODE OPTICAL FIBERS

BACKGROUND OF THE INVENTION

This invention relates to a single mode optical fiber. Various technical developments have been made with recent development in the art of optical communication. In recent years, in addition to various advantages of optical communication, for example, light weight, not inductive and no cross-talking it became possible to transmit data at a lower loss and over a wider frequency band than existing transmission lines utilizing such metal conductors as coaxial cables or millimeter waveguides. Recently, a long distance transmission over a distance of 100 Km at a frequency of 1 GHz is planed with optical fibers without using any repeating station and over ultra wide frequency band. To realize such a long distance ultra wide frequency band transmission it has been theoretically determined that the total dispersion of light should be less than ±1 ps /km/nm and that the transmission loss should be less than 0.5 dB/km.

Considering the transmission characteristics of the present day optical fiber from the stand point described above, there are caused certain problems for the reasons as will be described hereunder for effecting a ultra wide frequency band long distance transmission.

More particularly, light incident into the core of an optical fiber is propagated along the core by repeating reflections at the interface between the core and the cladding. The degradation of the transmission characteristics caused by the dispersion of light can be summarized into the following three items.

(1) multimode dispersion

This phenomenon is caused by the fact that the transmission constant representing the transmission conditions vary nonlinearly with respect to the angular frequency of light with the result that as the angular frequency increases higher order modes appear in the light propagating mode so that the group velocity differs for different modes (2) material dispersion ($\sigma_M$)

This phenomenon is caused by the fact that the refractive index of glass constituting the optical fiber varies nonlinearly with respect to the wavelength of light, and the material dispersion $\sigma_M$ of a single mode optical fiber is shown by the following equation $$\sigma_M = \frac{\lambda}{C} \cdot \frac{d^2 n1}{d\lambda^2} \quad (1)$$

where n1 represents the refractive indix of the core, $\lambda$ the wavelength of light, and C the velocity of light in vacuum.

(3) Waveguide dispersion ($\sigma_W$)

This dispersion is determined by a relation between the propagation constant $\beta$ and the angular frequency $\omega$ of light and in the case of the single mode optical fiber, the waveguide dispersion $\sigma_W$ is given by the following equation $$\sigma_W = \frac{1}{\lambda} \cdot \omega \cdot \frac{d^2\beta}{d\omega^2} \quad (2)$$

Regarding a multimode optical fiber above described three types of dispersions should be considered but in this invention, for the purpose of minimizing the dispersions so as to decrease signal distortions only a single mode optical fiber is considered in which case the dispersion (1) is not necessary to be taken into consideration and only dispersions (2) and (3) should be taken into consideration. Accordingly, for the single mode optical fiber the sum ($\sigma_M + \sigma_W$) of the material dispersion $\sigma_M$ and the waveguide dispersion $\sigma_W$ corresponds to the total dispersion $\sigma_T$ and the modulated frequency band width f of light that can transmit the signal without distortion is given by the following equation $$f = \frac{0.187}{\sigma_T} \quad (3)$$

A typical prior art optical fiber has a core diameter $2a = 9.0$ microns, the refractive index of core $n1 = 1.46319$, the difference between the refractive indices of the cladding and core $$\Delta = \left( \frac{n1 - n2}{n1} \times 100\% \right) = 0.2\%.$$

Such data are shown in a K. Daikoku et al paper entitled "Direct measurement of wavelength dispersion in optical fibers-difference method", Electronics Letters, 1978, Vol. 14. No. 5 pages 149-151.

With such prior art optical fiber, as the wavelength of light is varied from 0.9 to 1.6 microns, the material dispersion $\sigma_M$ varies in a range of from +66 ps/km/nm to −25 ps/km/nm, and in a case wherein the refractive index difference and the core diameter have values just described the waveguide dispersion varies in a range of from 4 to 13 ps/km/nm. For this reason, the total dispersion $\sigma_T$ varies in the positive and negative directions about $\lambda = 1.43$ microns. Accordingly, where the optical fiber is used at a wavelength $\lambda = 1.43$ microns at which the total dispersion is zero the distortion of the signal becomes a minimum thus enabling long distance wideband transmission. However, slight deviation of the wavelength from $\lambda = 1.43$ microns, causes the total dispersion $\sigma_T$ to rapidly increase whereby the frequency bandwidth f given by equation (1) would be rapidly narrowed.

Accordingly, with the prior art optical fiber even when the total dispersion $\sigma_T$ is selected to be ±1 ps/km/nm necessary for long distance transmission as has been pointed out before, the usable wavelength width is at more 0.02 microns and the wavelength is 1.41–1.43 microns. For this reason, for transmitting signals over a long distance with a wide frequency band efficient transmission is not possible even when the wavelength is multiplexed by wavelength division technique for the purpose of improving the transmission efficiency.

SUMMARY OF THE INVENTION

It is therefore an object of this invention to provide a novel single mode optical fiber having a transmission characteristic over a wider frequency band than the prior art single mode optical fiber and can provide a wavelength division multiplex transmission.

According to this invention there is provided a single mode glass fiber of the type comprising a core, a cladding surrounding the core and an intermediate layer interposed between the core and the cladding, characterized in that the core, the cladding and the intermediate layer have refractive indices n1, n2 and n3 respectively and that the refractive indices are related to satisfy the following relations.

$$0.5 < \Delta 1 < 1.5$$

$$-0.3 > \Delta 2 > -1.0$$

where $$\Delta 1 = \frac{n1 - n2}{n1} \times 100\% \text{ and } \Delta 2 = \frac{n3 - n2}{n2} \times 100\%$$

DESCRIPTION OF THE PREFERRED EMBODIMENT

Figure 1:
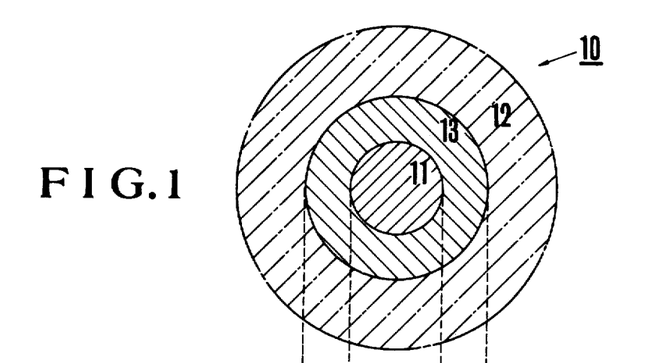
FIG. 1 is a cross-sectional view showing one embodiment of the single mode optical fiber embodying the invention.
Figure 2:
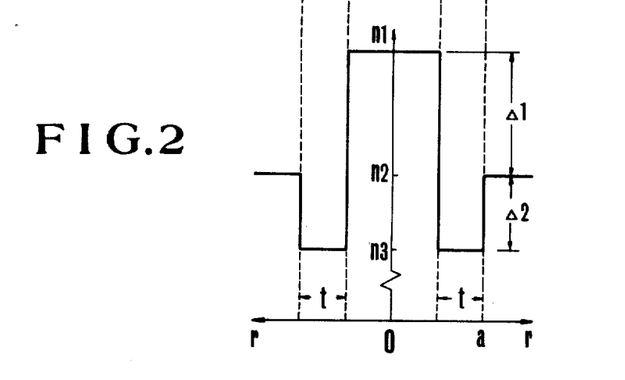
FIG. 2 is a graph showing the refractive index distribution in the radial direction of the single mode optical fiber shown in FIG. 1.

FIG. 1 shows the basic construction of a single mode optical fiber 10 embodying the invention which comprises a core 11 consisting essentially of quartz glass having a diameter 2a = 7.2 microns, for example, a cladding 12 (shown by dot and dash lines) made of similar material and surrounding the core 11 and having an outer diameter of 125 microns, for example, and an intermediate layer 13 disposed between the core and the cladding and also made of similar material and having a thickness of 1.0 micron, for example. In this embodiment, since the outer diameter of the cladding 12 is sufficiently larger than the diameter of the core and the thickness t of the intermediate layer 13, the refractive index profile as viewed in the radial (r) direction from the center of the fiber 10 is shown in FIG. 2 in which the refractive index of the core 11 is designated by n1, that of the cladding 12 by n2 and that of the intermediate layer 13 by n3. As can be noted from this characteristic curve in the optical fiber of this type the refractive index n2 of the cladding 12 is smaller than that n1 of the core 11 while the refractive index n3 of the intermediate layer 13 is smaller than those n1 and n2 of the core 11 and the cladding 12 respectively.

To make larger the refractive index of the core 11 than that n2 of the cladding 12 a dopant, for example germanium is incorporated into the quartz glass constituting the core 11. Further, to make the refractive index n3 of the intermediate layer 13 to be smaller than that of the cladding, fluorine is doped to the quartz glass constituting the intermediate layer. For the cladding 12 quartz glass containing any dopant is used. When incorporating germanium into quartz glass 10 mole % of germanium oxide (GeO$_2$) is used and where fluorine is incorporated it is doped in an amount of 4.2 mole %.

The difference Δ1 in the refractive indices of the core 11 and the cladding 12 and that Δ2 in the refractive indices of the intermediate layer 13 and the cladding 12 are shown by the following equations.

$$\Delta 1 = \frac{n1 - n2}{n1} \times 100\% \tag{4}$$

$$\Delta 2 = \frac{n1 - n2}{n2} \times 100\% \tag{5}$$

When the dopants are used at the mole ratios described above, Δ1 is equal to 1% and Δ2 is equal to −1%.

According to this invention, when these differences Δ1 and Δ2 in the refractive indices are selected to satisfy the following relations $$0.5\% < \Delta 1 < 1.5\%$$

$$-0.3\% > \Delta 2 > -1.0\%$$

It is possible to obtain an optical fiber having a light dispersion σ$_T$ of less than ±1 ps/km/nm, and the theoretical value of the transmission loss closely related to the refractive-index difference of less than 0.5 dB/km.

The optical fiber embodying the invention can have a wavelength width of low dispersion of from 0.05 to 0.32 micron depending upon the values of the differences Δ1, Δ2 and diameter 2a. Consequently, where the wavelength width is 0.05 microns, when the spacing of the wavelength multiplexing is made to be equal to 200 Å (=0.02um), multiplexing of 2 waves is possible whereas multiplexing of 16 waves is possible with a wavelength width of 0.32 micron. The wavelength spacing described above is obtained when the wavelength shift of a semiconductor laser caused by temperature variation is ±20 Å, and wavelength selectivity of the semiconductor laser is ±50 Å, and a spacing of 50 Å is necessary to separate adjacent channels of the elements comprising a wave dividing circuit.

The reason that the lower limit of the refractive index difference Δ1 is selected to be 0.5% lies in that with the difference smaller than this value it becomes difficult to confine the light within the core thus increasing bending loss.

When the upper limit of Δ1 is selected to be higher than 1.5% and when the lower limit of Δ2 is selected to be lower than −1%, the residual stress increases due to the difference in the thermal expansion coefficients of the core, the intermediate layer and the cladding, thus causing fracture of these portions. When the upper limit of Δ2 is selected to be higher than −0.3%, the band width of the wavelength is narrowed making it difficult to multiplex the wavelength. The superiority of the optical fiber according to this invention having Ω type distribution characteristics can be more fully understood from the following description.

Figure 3:
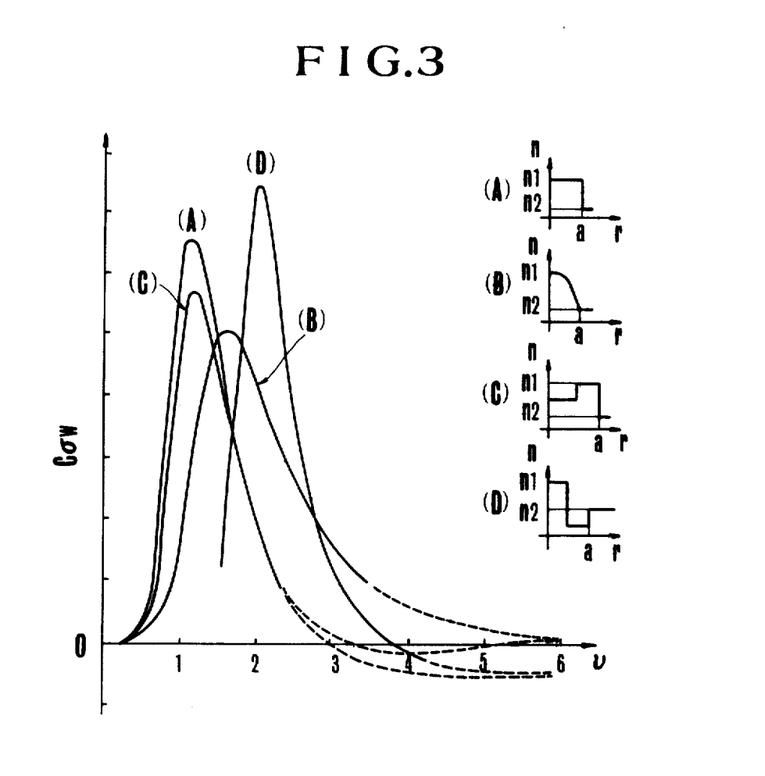
FIG. 3 is a graph showing the relation between light to be transmitted through a single mode optical fiber of this invention having letter Ω (Omega) shaped refractive index distribution characteristic and through a single mode optical fiber having different refractive index distribution characteristic, and the waveguide dispersion.

FIG. 3 shows the relationship between the frequency of light to be transmitted through a single mode optical fiber of this invention having a Ω type refractive index distribution and a single mode optical fiber having different refractive index distribution and the waveguide dispersion in which the ordinate represents a normalized waveguide dispersion $C\sigma_W$, that is the product of the waveguide dispersion $\sigma_W$ and the light velocity C, and the abscissa represents a normalized frequency $v$ calculated according to the following equation.

$$v = \frac{2\pi}{\lambda} \cdot n1 \cdot a \cdot \sqrt{2\Delta 1} \qquad (6)$$

In FIG. 3, curve A shows a step type refractive index distribution, curve B a quadratic distribution, curve C a M type distribution, and curves D the Ω type refractive index distribution according to this invention. The values of Δ1, Δ2 and the thickness t of the intermediate layer of these characteristics are as follows:

(A)–(C) ... Δ1 = 1.0%

(D) ... Δ1 = 0.5%, Δ2 = −0.5% and t = 0.3a

Where a represents the radius of the core.

In the cases (A)–(C) since the intermediate layer is not provided, only Δ1 is concerned.

Noting the normalized waveguide dispersion $C\sigma_W$, curve D is the largest and varies in the negative direction.

Since the total dispersion $\sigma_T$ can be minimized by causing the material dispersion $\sigma_M$ and the waveguide dispersion $\sigma_W$ to cancel with each other it is clear that curve D, that is the symmetrical Ω type distribution of this invention is most advantageous.

Figure 4:
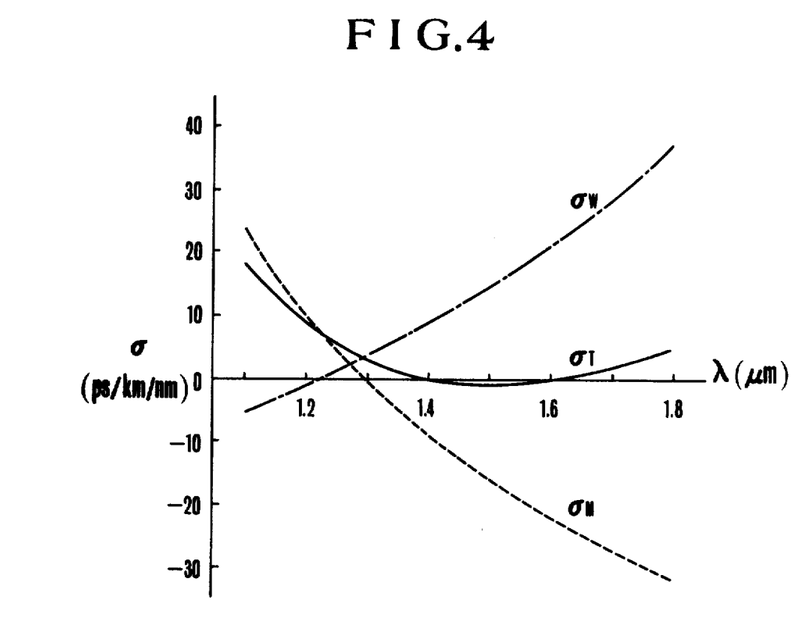
FIG. 4 is a graph showing the relationship between the light wavelength and various dispersion characteristics of the single mode optical fiber embodying the invention.

FIG. 4 shows the relationship between the wavelength λ of light to be transmitted through the single mode optical fiber of this invention having the symmetrical Ω type distribution and variations of respective dispersions $\sigma_M$, $\sigma_T$ and $\sigma_W$. From FIG. 4 it can be noted that the total dispersion $\sigma_T$ is less than ±1 ps/km/nm in a wide wavelength range of λ = 1.35–1.67 microns.

Figure 5:
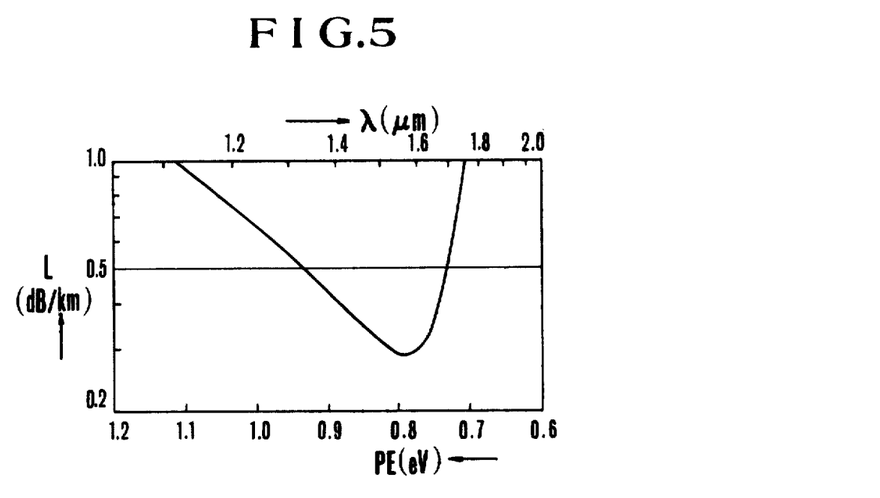
FIG. 5 is a graph showing the relationship among the transmission loss of the single mode optical fiber embodying the invention, the light wavelength and the photon energy.

FIG. 5 is a graph showing the calculated relation between the theoretical transmission loss L of an optical fiber having a refractive-index difference Δ1 = 1% (See Miya et al paper in Electron Letter Vol. 15 p 106, 1979) and photon energy PE and the variation in light wavelength λ. As shown, in a range of λ = 1.32–1.69 microns, the transmission loss L is maintained below 0.5 dB/km.

This shows that the optical fiber shown in FIG. 1 is extremely useful for transmitting light over an ultra long distance in an extra wide band.

Figure 6:
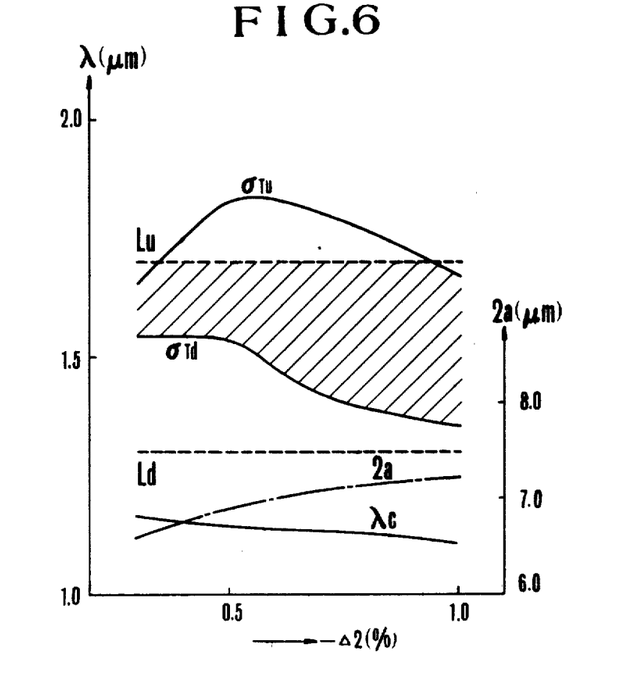
FIGS. 6, 7 and 8 are graphs showing the relationship among the light wavelength, difference in the refractive indicies, core diameter, the thickness of an intermediate layer, and the core diameter.
Figure 7:
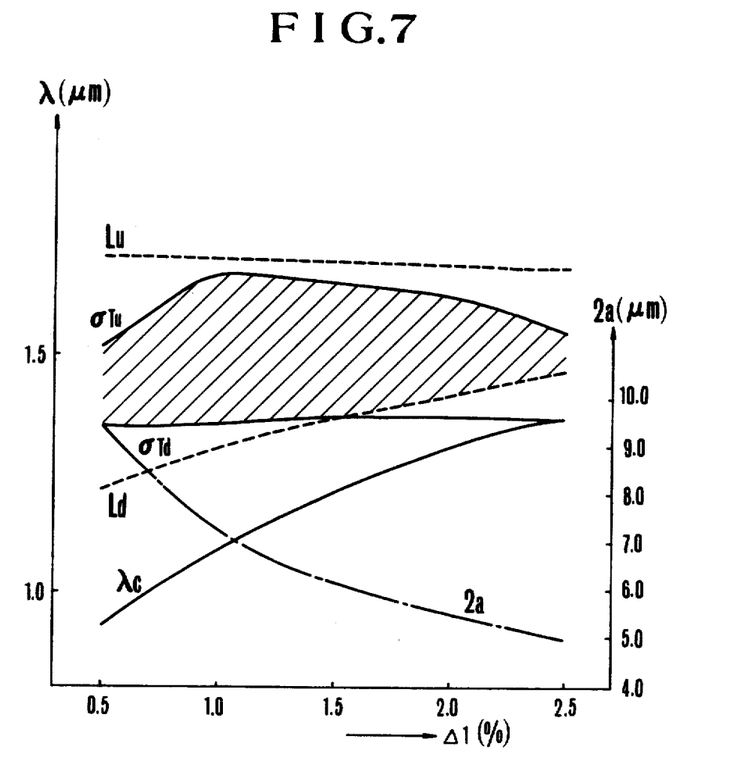
Figure 8:
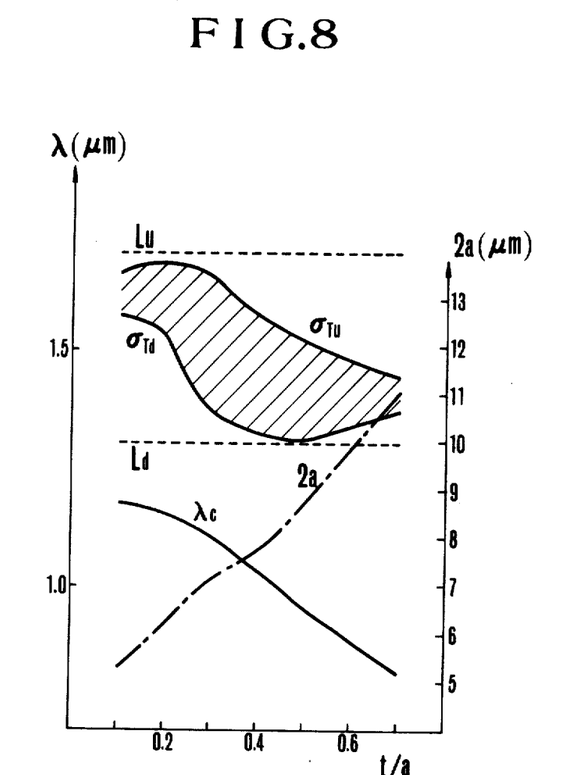

FIGS. 6 through 8 show variations in the total dispersion $\sigma_T$, a wavelength $\lambda_C$ at which higher order modes generate, and the core diameter 2a. In these figures, the wavelength λ and the diameter 2a of the core 11 are shown along the ordinate from which a range in which the transmission loss is less than 0.5 dB/km can be determined. A range in which the total dispersion $\sigma_T$ becomes less than ±1 ps/km/nm is shown by curves $\sigma_{Tu}$ and $\sigma_{Td}$ and the limit at which the transmission loss becomes 0.5 dB/km is shown by Lu and Ld. In order to satisfy the conditions that the mode is the single mode, that the total dispersion $\sigma_T$ is less than ±1 ps/km/nm and that the transmission loss is less than 0.5 dB/km, the conditions shown by shaded area must be fulfilled. This shows a bandwidth of a usable wavelength λ.

In FIG. 6 Δ1 = 1.0% and t/a = 0.3 (both fixed values) and the abscissa shows Δ2, which in FIG. 7, Δ2 = −1.0%, t/a = 0.3 (both fixed values) and the abscissa represents Δ1. In FIG. 8, Δ1 = 1.0%, Δ2 = −1.0% (both fixed values) and the abscissa represents t/a. From these figures, it is possible to determine the values of Δ1, Δ2, t/a under respective conditions, and the diameter of the optical fiber can be determined from curve 2a showing the diameter 2a of the core 11.

Accordingly, values of Δ1 = 1.0–1.5% and Δ2 = −0.5−−1.0% are suitable for transmitting light having a wavelength of about 1.5 microns, but depending upon the conditions, the values of Δ1 and Δ2 are determined from FIGS. 6–8 and then the values of 2a and t/a are determined to obtain a single mode optical fiber capable of operating over ultra wide band.

By making the permissible total dispersion $\sigma_T$ to be larger than ±1 ps/km/nm and the permissible transmission loss L to be larger than 0.5 dB/km, light transmission over wideband becomes possible.

As above described, according to this invention, as it is possible to make the total dispersion to be less than ±1 ps/km/nm over a wide bandwidth including a wavelength near 1.5 microns at which the transmission loss of a quartz optical fiber becomes a minimum, it is possible to transmit data over an ultra long distance in an ultra wide band width by using wavelength multiplexing (WDM). Technique use of the intermediate layer having a smaller refractive index than the cladding not only prevents leakage of light toward the cladding but also decreases bending loss due to bending of the optical fiber and microbending loss which are advantageous for transmitting lights of various type.

While in the foregoing embodiment germanium was incorporated into quartz glass for the purpose of increasing the refractive index of the core, other dopants such as phosphor, titanium, aluminum, zirconium, lead, barium, gallium or the like can also be used. Further, for the purpose of decreasing the refractive index of the intermediate layer, fluorine was incorporated into quartz glass, but it is possible to substitute boron for fluorine. Furthermore, in the foregoing embodiment no dopant was incorporated into quartz glass used to form the cladding, so long as the aforementioned relation between Δ1 and Δ2 can be maintained the same dopant as that incorporated into the quartz glass for the core can be added.

The single mode optical fiber of this invention is manufactured according to the following method, for example.

In this example, a modified chemical vapor phase deposition (MCVD) method is used. More particularly, a quartz glass tube having an outer diameter of 14 mm and an inner diameter of 12 mm is prepared and a silicon dioxide film containing about one mole % of fluorine is deposited on the inner wall of the glass tube by vapor phase reaction. In the same manner, a silicon dioxide film containing about 5 mole % of germanium dioxide is deposited on the previously formed silicon dioxide film. Thereafter the quartz glass tube is heated to a high temperature of 1700° C. to cause the deposited layers to firmly fuse to the inner wall of the tube. Then after heating the tube to 2000° C., it is drawn to obtain a structure as shown in FIG. 1.

Instead of adding germanium for the purpose of increasing the refractive index of the core 11 and instead of adding fluorine for the purpose of decreasing the refractive index of the intermediate layer 13, phosphor and boron may be substituted for germanium and fluorine respectively.

In this example, although quartz glass not containing any dopant is used for the cladding 12, germanium or phosphor may be added for the purpose of increasing the refractive index of the cladding 12. In the same manner, quartz glass not incorporated with any dopant may be used for the intermediate layer 13 and quartz glass incorporated with an dopant that increases the refractive index may be used as the cladding 12.

Figure 9:
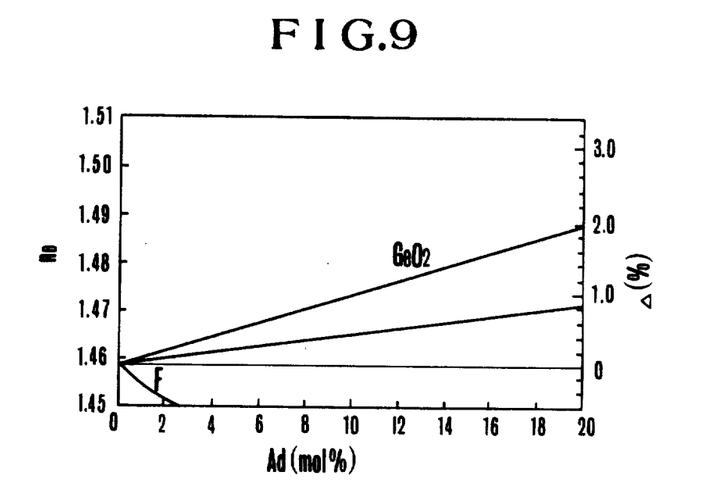
FIG. 9 is a graph showing the relationship among the quantity of a dopant incorporated into quartz glass, the refractive index and the difference in the refractive indices.

FIG. 9 is a graph showing the relationship among the quantity of an dopant A, the refractive index $n_D$ and the refractive index difference $\Delta$ of quartz. As can be noted, 3–10 mole % of germanium dioxide $GeO_2$ or 10–24 mole % of phosphor pentaoxide are suitable for increasing the refractive index, while 1 to 2 mole % of fluorine is suitable for decreasing the refractive index.

Figure 10:
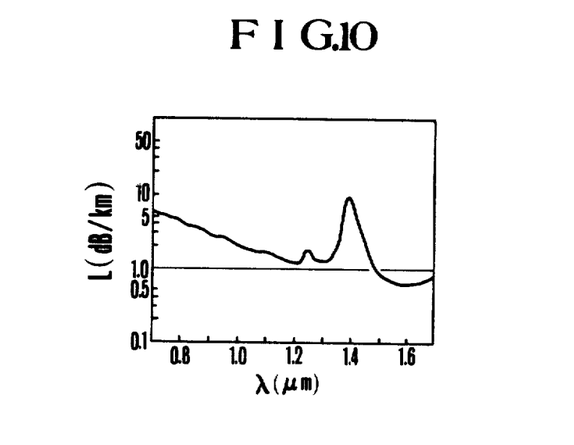
FIG. 10 is a graph showing the transmission loss of the embodiment according to this invention.

FIG. 10 shows the relationship between the transmission loss L and the wavelength of an optical fiber having a core 11 of a radius a=6.6 microns, an intermediate layer 13 having a thickness t=3.4 microns, a refractive index difference $\Delta 1 = (n1^2 - n2^2)/2n1^2 = 0.51\%$ between the core 11 and the cladding 12, and a refractive index difference $\Delta 2 = (n3^2 - n2^2) 2n2^2 = -0.31\%$ between the cladding 12 and the intermediate layer 13. As can be noted from FIG. 10 the minimum loss is 0.6 dB/km at a wavelength of $\lambda = 1.58$ microns.

Figure 11:
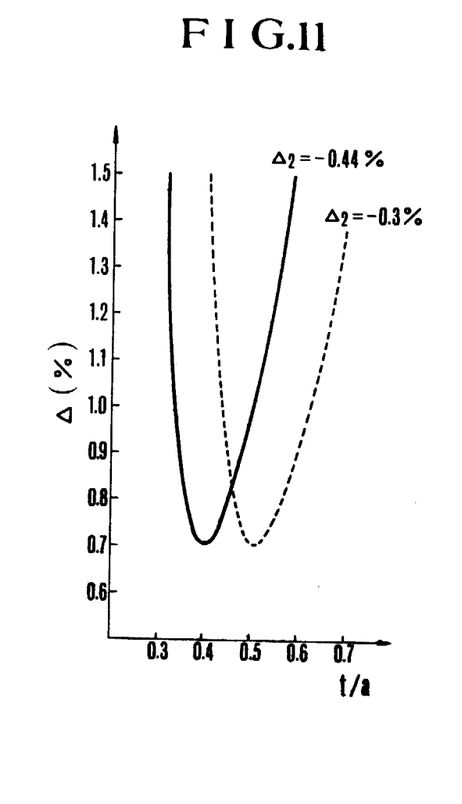
FIG. 11 shows the relationship between the ratio of the thickness of the intermediate layer to the core diameter for different differences in the refractive indices of the core and the cladding.

FIG. 11 is a graph showing the relationship between the refractive index difference $\Delta 1$ between the core 11 and the cladding 12 and the ratio t/a of the thickness t of the intermediate layer 13 to the radius a of the core 11. From this graph it can be expected that when $\Delta 2 = -0.5\%$ the lefthand portion of the curve will be near a point where t/a=0.5 and when $\Delta 2 = -0.5\%$, the right hand portion of the curve will be near a point where t/a=0.7. Since $\Delta 1$ of less than 1.5% is desirable from the standpoint of the residual stress which is caused by the thermal expansion between respective layers, ranges of t/a=0.3–0.7 and $\Delta 1 = 0.5$–1.5% are adequate.

As shown by a solid line and a dotted line, when the refractive index difference $\Delta 2$ is selected to be in a range of $-0.3\%$ to $-1.0\%$, $\Delta 2$ would be in the above described range.

Figure 12:
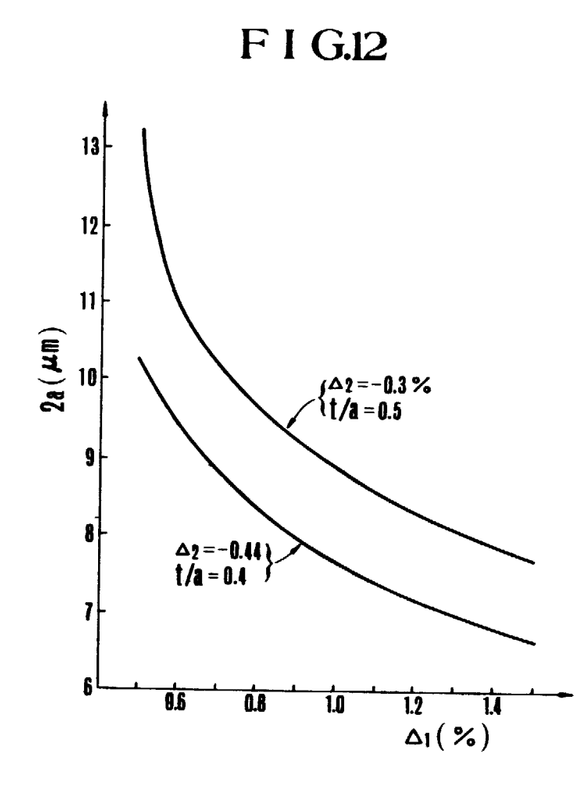
FIG. 12 is a graph showing an optimum relationship between the difference in the refractive indices of the core and the cladding, and the core diameter.

FIG. 12 is a graph showing the optimum relationship between the refractive index difference $\Delta 1$ between the core 11 and cladding 12, and the diameter 2a of the core 11. Thus, when $\Delta 2$, t/a and $\Delta 1$ are known, diameter 2a and radius a can readily be determined, and the thickness t of the intermediate layer 13 can also be determined based on these data.

Respective refractive indices of the core 11, cladding 12 and intermediate layer 13 can be determined by the relations shown in FIGS. 11 and 12.

What is claimed is:

1. A single mode oritical fiber comprising core having a refractive index of n1, a cladding surrounding said core and having a refractive index of n2 and an intermediate layer interposed between said core and cladding and having a refractive index of n3, wherein said refractive indices n1, n2 and n3 and selected to satify the following relations.

$$0.5 < \Delta 1 < 1.5$$

$$-0.3 > \Delta 2 > -1.0$$

where $$\Delta 1 = \frac{n1 - n2}{n1} \times 100\% \text{ and } \Delta 2 = \frac{n3 - n2}{n2} \times 100\%$$

2. The single mode optical fiber according to claim 1 wherein said core, said cladding and said intermediate layer are made of glass consisting essentially of quartz glass.

3. The single mode glass fiber according to claim 1 wherein said core is made of glass consisting essential of quartz glass incorporated with one or more dopants selected from the group consisting of germanium, phosphor, titanium, aluminium, tantalum, zinconium, lead, barium and gallium.

4. The single mode glass fiber according to claim 2 wherein said intermediate layer is made of quartz glass incorporated with fluorine, boron or both.

5. The single mode glass fiber according to claim 1 where in ratio of thickness of said intermediate layer to the radius of said core is selected to be in a range of from 0.3–0.7, and the radius of said core is determined in accordance with a difference in the refractive indicies of said core and said cladding, a difference in the refractive indicies of said intermediate layer and said cladding and a ratio of the thickness of said intermediate layer to the radius of said core.

6. The single mode oritical fiber according to claim 1 wherein 5–10 mole % of germanium dioxide or 10–24 mole % of phosphor pentaoxide is used as an additive for increasing refractive index, and 1–2 mole % of fluorine is used as an additive for decreasing refractive index.

7. The single mode optical fiber according to claim 1 wherein absolute value, of the refractive index difference between the core and cladding and of the refractive index difference between the intermediate layer and the cladding are equal.

* * * * *